United States Patent [19]
Hsieh

[11] Patent Number: 6,139,115
[45] Date of Patent: Oct. 31, 2000

[54] GOLF CADDIE WHEEL HUB

[76] Inventor: Daniel Chao-Chih Hsieh, 17 Junction Road, Wahroonga N.S.W. 2076, Australia

[21] Appl. No.: 09/226,921

[22] Filed: Jan. 6, 1999

[51] Int. Cl.[7] .................................................... B60B 27/00
[52] U.S. Cl. .................................... 301/105.1; 301/124.1; 384/279; 384/300
[58] Field of Search ................................ 301/105.1, 111, 301/124.1, 131, 126; 384/279, 300, 397

[56] References Cited

U.S. PATENT DOCUMENTS

| | | | |
|---|---|---|---|
| 882,846 | 3/1908 | Sachs | 301/105.1 |
| 1,129,726 | 2/1915 | Pugh | 301/105.1 |
| 1,265,347 | 5/1918 | Ledwinka | 301/105.1 |
| 3,439,955 | 4/1969 | Cadiou | 301/126 |
| 5,762,423 | 6/1998 | Mori et al. | 384/279 |
| 6,022,083 | 2/2000 | Brookins | 301/105.1 |
| 6,024,417 | 2/2000 | Jones, II et al. | 301/124.1 |

*Primary Examiner*—S. Joseph Morano
*Assistant Examiner*—Jason R. Bellinger
*Attorney, Agent, or Firm*—Dougherty & Troxell

[57] ABSTRACT

A wheel hub to be used in a golf motor caddie, has an axle; an outer tube, having a first end with a small opening, a second end with a large opening and three sections containing a first, a second and a third chambers, with an inner circular groove cut into the outer tube close to the second end; an inner tube, surrounding the axle; a first, plastics bearing, inserted in the first chamber; a second bearing, inserted in the second chamber; a third, oil-lubricated bearing, inserted in the third chamber; and a C-shaped washer, laid into the groove, for securing the third bearing. The outer tube is a common outer layer for all bearings. The first and second bearings enclose the inner tube, while the third, oil-lubricated bearing directly encloses the axle, such that no uneven distribution of forces and no eccentric rotation occur.

8 Claims, 4 Drawing Sheets

GOLF CADDIE WHEEL HUB

BACKGROUND OF THE INVENTION

1. Field of the Invention

The present invention relates to a wheel hub, particularly to a wheel hub to be used in a golf motor caddie.

2. Description of Related Art

Today's people spend much of their time at leisure. Especially golf has become a popular pastime. To save costs, instead of human caddies electrically driven golf motor caddies are employed to carry golf utensils. Conventional golf motor caddies are useful and cheap. However, there are still problems with the wheel hubs thereof.

A wheel hub 9 of a conventional golf motor caddie, as shown in FIGS. 3 and 4, comprises: a central axle 90; an inner tube 91; an outer tube 92, having a first end with a small opening 921 and a narrow chamber 923 and a second end with a large opening 922 and a wide chamber 924; a plastics bearing 93 around the narrow chamber 923; a second bearing 94 around the wide chamber 924; and a C-shaped washer 95 to keep the second bearing 94 concentric with the axle 90.

The outer tube 92 is connected with the plastics bearing 93, the second bearing 94 and the C-shaped washer 95 and put over the inner tube 91 to form the wheel hub 9. The wheels of the golf motor caddie each have a wheel rim 10 and a spindle 11. The wheel hub 9 is placed in a space within the spindle 11 and the wheel rim 10, ensuring that the wheel rotates smoothly. The plastics bearing 93 and the second bearing 94 surround the axle 90, which is convenient. However, for easy assembly, a comparatively large gap of about 0.15 mm width remains between the axle 90 and the inner tube 91. The width of this gap increases after prolonged use of the golf motor caddie, leading to uneven distribution of forces while the wheel rotates.

SUMMARY OF THE INVENTION

It is therefore an object of the present invention to provide a wheel hub with reduced friction between the axle and the spindle.

Another object of the present invention is to provide a wheel hub that rotates evenly and smoothly.

The present invention can be more fully understood by reference to the following description and accompanying drawings.

DETAILED DESCRIPTION OF THE PREFERRED EMBODIMENT

Figure 1:
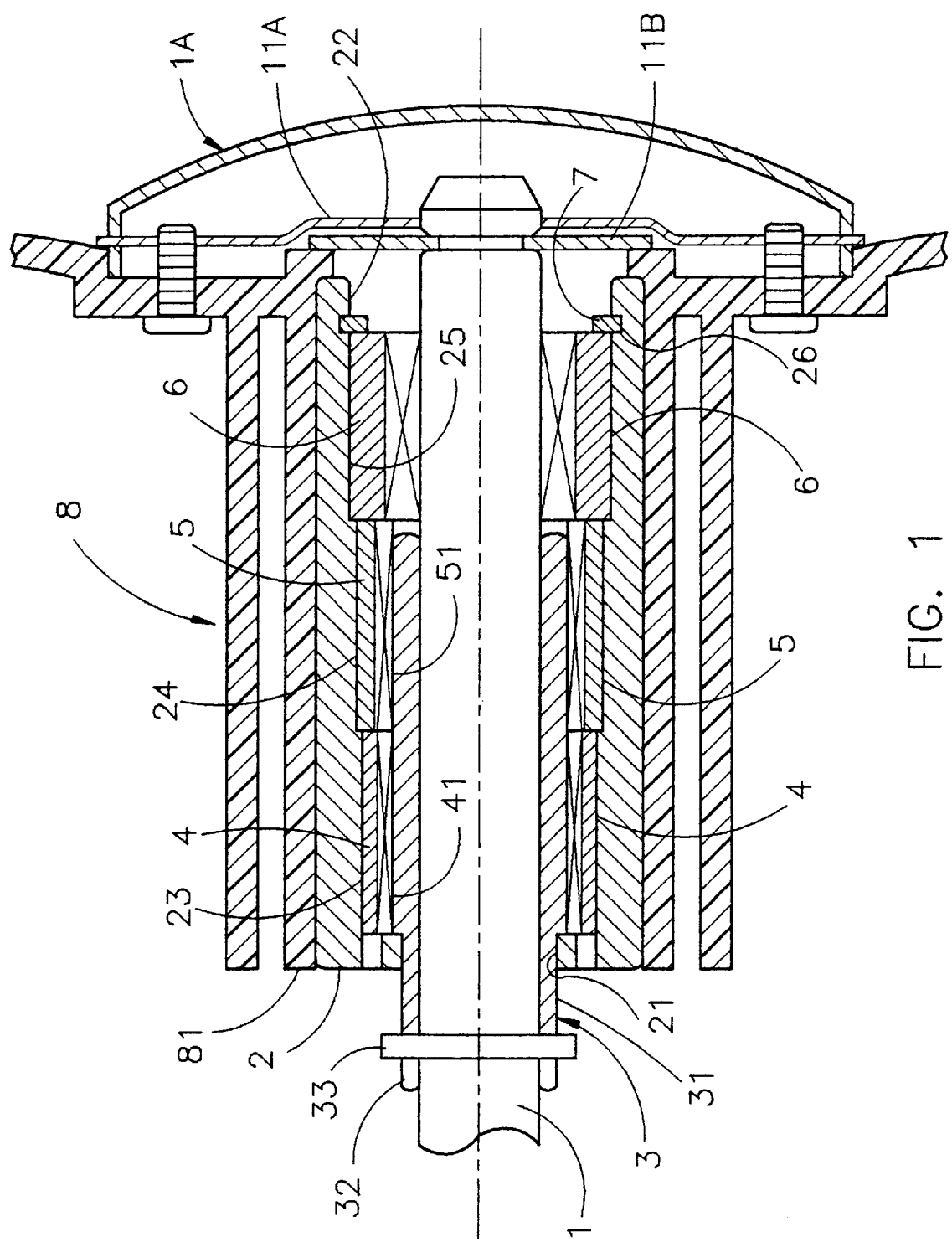
FIG. 1 is a sectional view of the wheel hub of the present invention, mounted on an axle.
Figure 2:
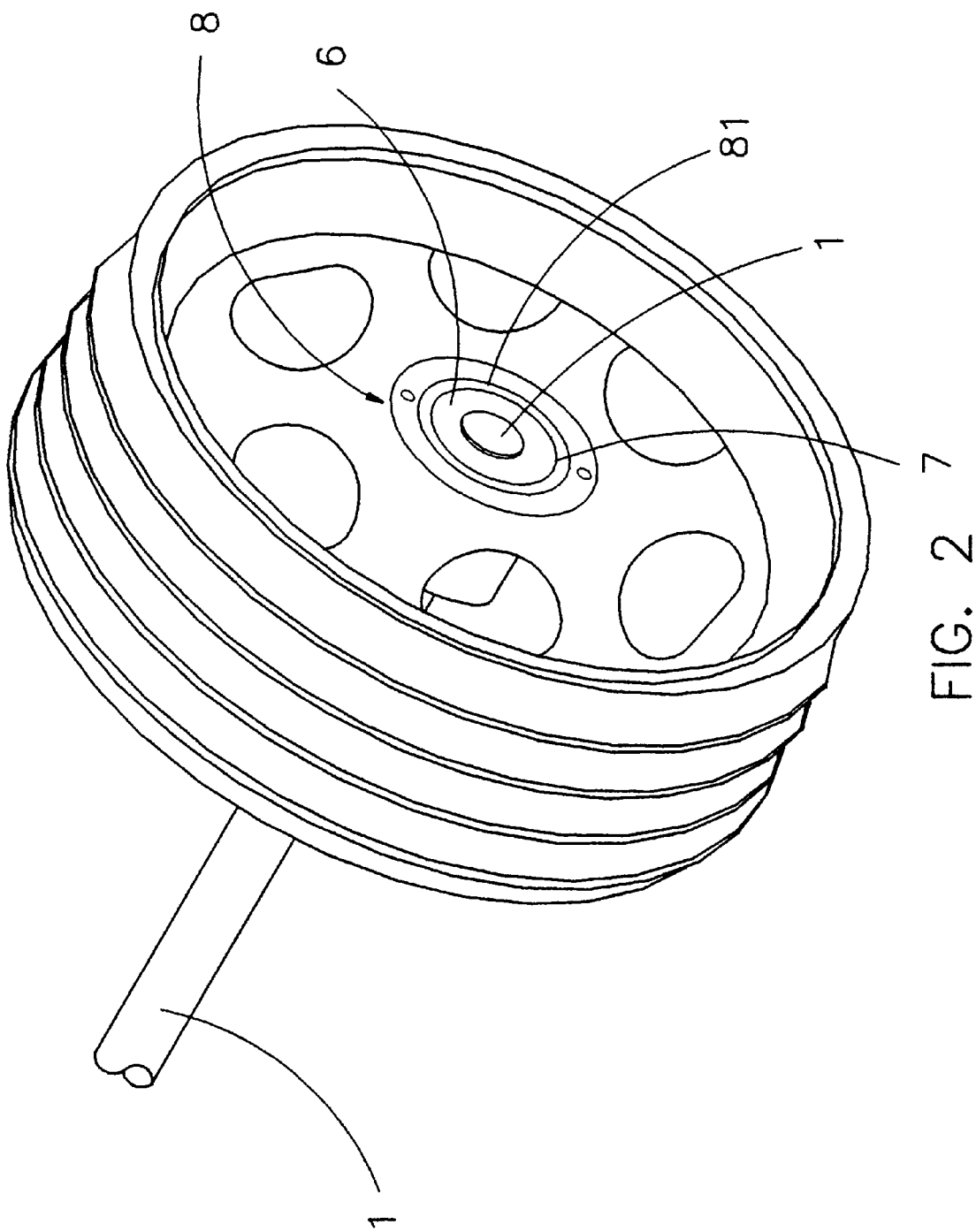
FIG. 2 is a perspective view of the wheel hub of the present invention in conjunction with a wheel.
Figure 3:
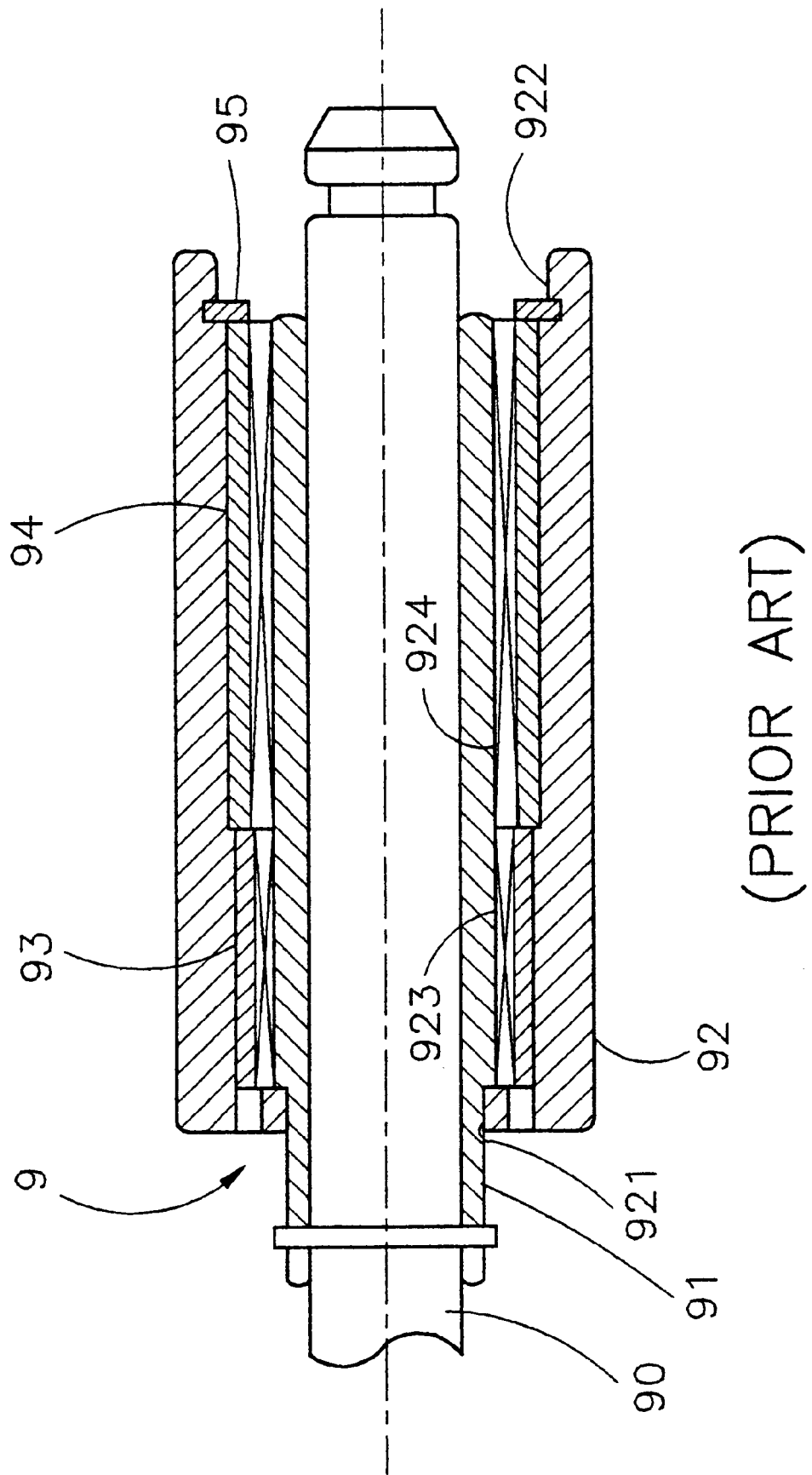
FIG. 3 (prior art) is a sectional view of a conventional wheel hub, mounted on an axle.
Figure 4:
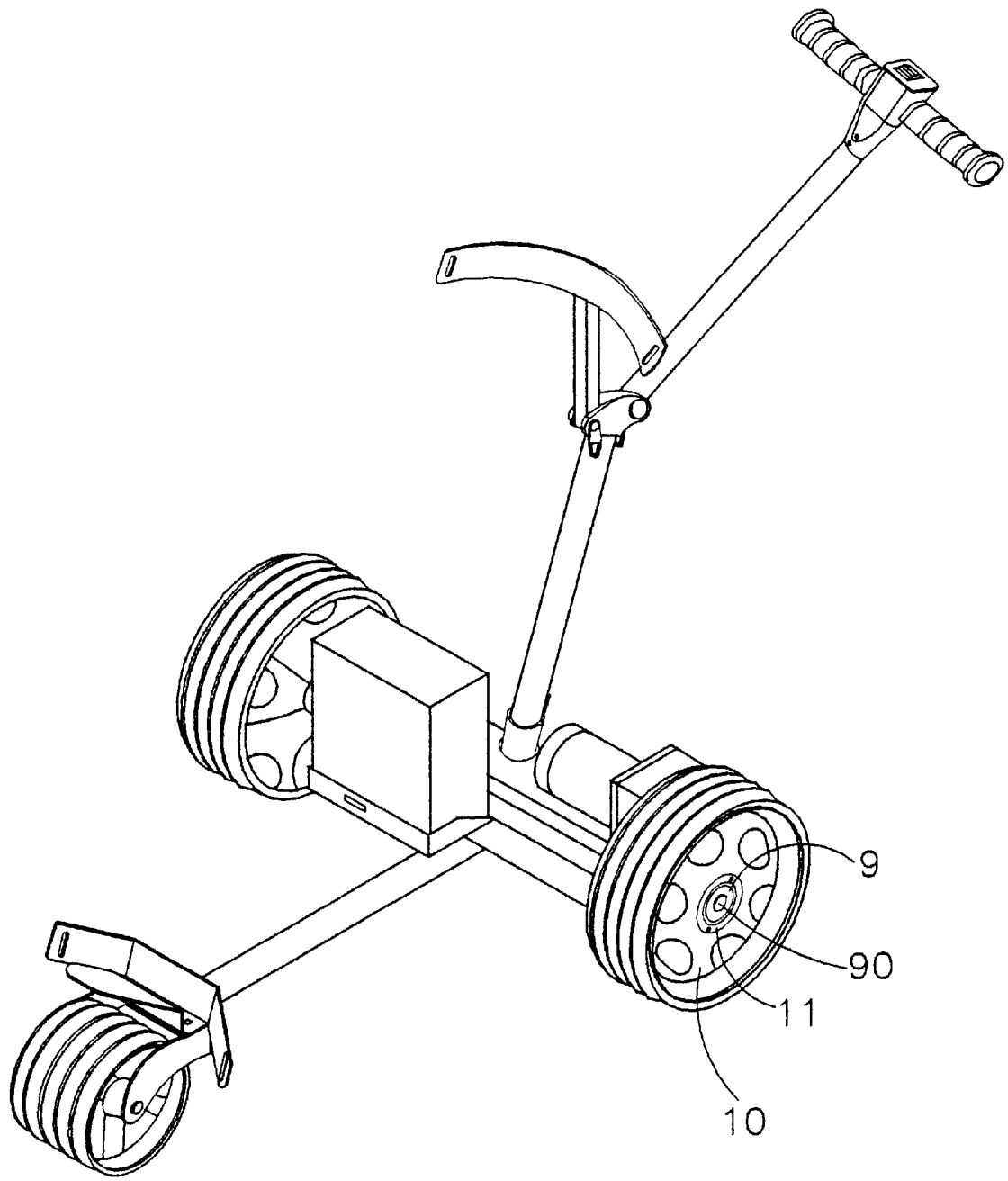
FIG. 4 (prior art) is a perspective view of a conventional wheel hub in conjunction with a golf motor caddie.

As shown in FIGS. 1 and 2, the wheel hub of the present invention is mounted between an axle 1 of a golf motor caddie and a spindle 81 on a wheel rim 8 to assist in an unidirectional movement of the golf motor caddie. The wheel hub of the present invention comprises: an outer tube 2; an inner tube 3; a first plastics bearing 4; a second bearing 5; a third oil-lubricated bearing 6; and a C-shaped washer 7.

The outer tube 2 has a first end with a small opening 21 and a second end with a large opening 22. Next to the small opening 21, the outer tube 2 has a relatively narrow first chamber 23; in a middle section a second chamber 24 of medium width is placed; and in a final section, next to the large opening 22, the outer tube 2 has a relatively wide third chamber 25. A circular inner groove 26 is cut into the outer tube 2 close to the second end thereof.

The inner tube 3 encloses the axle 1, having a first end 31 with a blocking part 32 and a lock 33. The first plastics bearing 4 is placed in the first chamber 23 of the outer tube 2, surrounding an inner opening 41, the second bearing 5 is placed in the second chamber 24, surrounding an inner opening 51, and the third oil-lubricated bearing 6 is placed in the third chamber 25. The C-shaped washer 7 is laid into the groove 26 to keep the lubricated bearing 6 in position.

To assemble the wheel hub of the present invention, first the first plastics bearing 3 is inserted into the first chamber 23, then the second bearing 5 is inserted into the second chamber 24. After that, the inner tube 3 is put through the large opening 22 of the outer tube 2, filling the inner openings 41 and 51 and with the first end 31 thereof passing through the small opening 21 of the outer tube 2. Finally, the third oil-lubricated bearing 6 is inserted into the third chamber 25 and secured by putting the C-shaped washer 7 into the groove 26.

Referring to FIG. 1, the first end 31 of the inner tube 3 is fixed to the axle 1 by the blocking part 32 and the lock 33. The axle 1 has an end, which is covered by a cover 1A. A positioning plate 11A and a blocking plate 11B below the cover 1A fix the wheel hub of the present invention to the axle 1. Of course, several variations for cover 1A, the positioning plate 11A and the blocking plate 11B are possible. These variations are not essential for the present invention and therefore do not need further explanation.

The wheel hub of the present invention has less friction between the axle 1 and the inner tube 3, while ensuring a concentric arrangement thereof, for five reasons:

1. The first plastics bearing 4, the second bearing 5 and the third oil-lubricated bearing 6 all have the outer tube 2 as a common outer layer and therefore run concentric with each other. Any deviation of the first plastics bearing 4 and the second bearing 5 from a concentric rotation is corrected by the third oil-lubricated bearing 6.
2. The third oil-lubricated bearing 6 is directly connected with the axle 1, compensating for any eccentricity between the axle 1 and the spindle 81.
3. By ensuring a concentric rotation of the first plastics bearing 4 and the second bearing 5 friction is reduced.
4. Reduced friction lets the wheel run smoothly, without swaying.
5. Reduced friction avoids widening gaps between the axle 1 and the bearings 4, 5, 6, so there will be no uneven distribution of forces on the axle.

While the invention has been described with reference to a preferred embodiment thereof, it is to be understood that modifications or variations may be easily made without departing from the spirit of this invention which is defined by the appended claims.

What is claimed is:

1. A wheel hub assembly for a motorized golf caddie comprising:

a) an axle;

b) an inner tube mounted around and secured to the axle such that a distal end portion of the axle extends outwardly of the inner tube;

c) an outer tube having: first and second ends; a first opening in the first end; a second opening in the second end, the second opening being larger than the first opening; first, second and third chambers formed in the interior of the outer tube, a cross-sectional dimension of the first chamber being smaller than a corresponding cross-sectional dimension of the second chamber, which is smaller than a corresponding cross-sectional dimension of the third chamber;

d) a wheel hub mounted on an outer surface of the outer tube;

e) a first bearing located in the first chamber and interposed between the outer tube and the inner tube;

f) a second bearing located in the second chamber and interposed between the outer tube and the inner tube; and, g) a third bearing located in the third chamber and interposed between the outer tube and the axle.

2. The wheel hub assembly of claim 1 wherein the first bearing comprises a plastic bearing.

3. The wheel hub assembly of claim 1 wherein the third bearing comprises an oil-lubricated bearing.

4. The wheel hub assembly of claim 1 wherein the distal end of the axle has an annular groove and further comprising a blocking plate affixed to the wheel hub and extending into the annular groove.

5. The wheel hub assembly of claim 4 further comprising a cover affixed to the wheel hub and covering the blocking plate.

6. The wheel hub assembly of claim 4 further comprising a positioning plate affixed to the wheel hub and contacting the distal end of the axle.

7. The wheel hub assembly of claim 6 further comprising a cover affixed to the wheel hub and covering the blocking plate and the positioning plate.

8. The wheel hub assembly of claim 1 wherein the first opening is smaller than the cross-sectional dimension of the first chamber.

* * * * *